J. ILLINGWORTH.
VEHICLE WHEEL.
APPLICATION FILED JAN. 19, 1910.
969,536.
Patented Sept. 6, 1910.
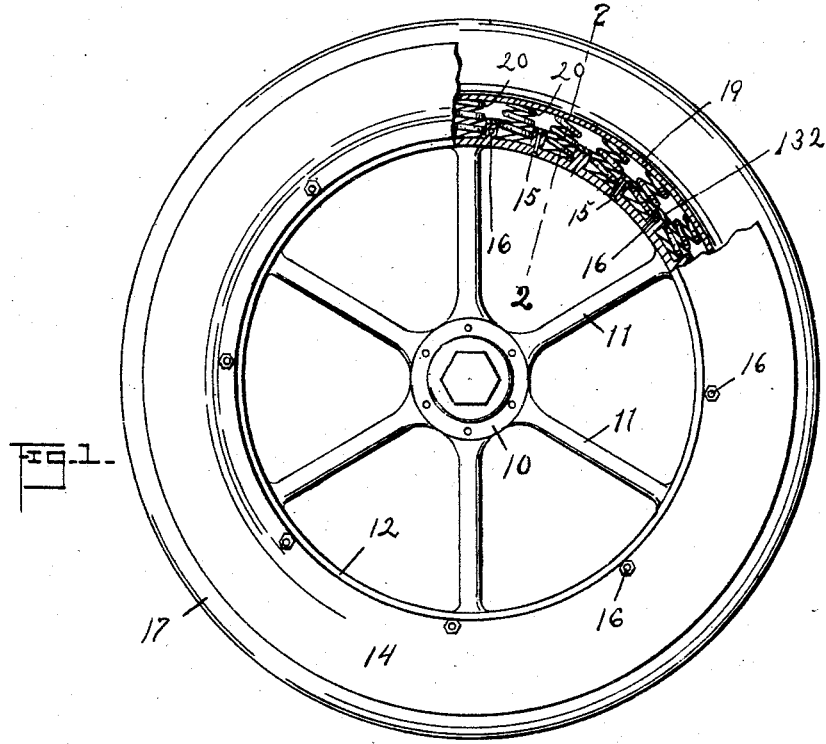
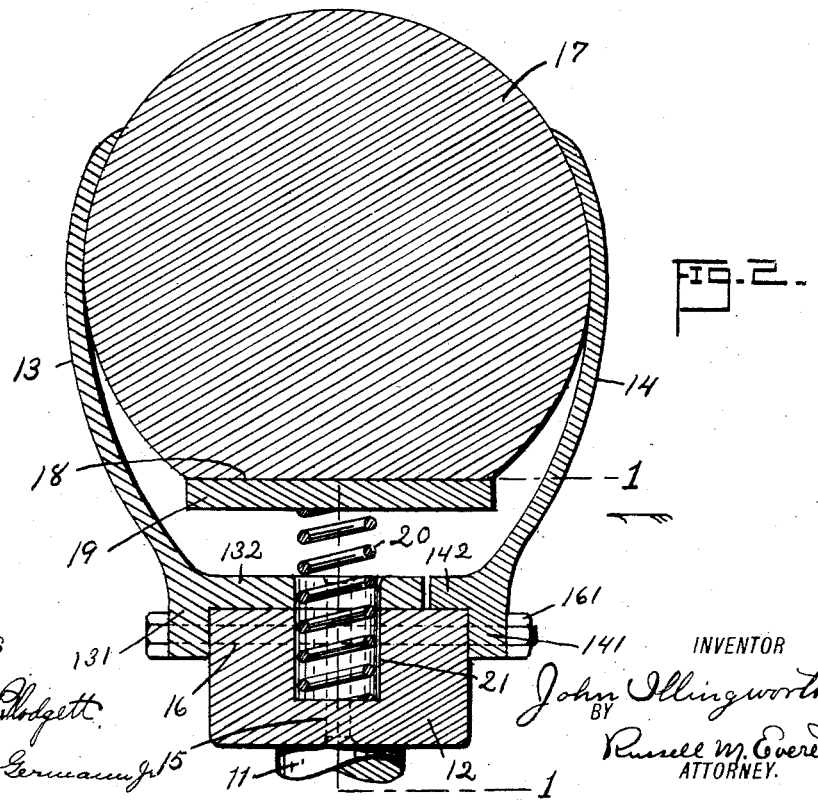
WITNESSES
Francis E. Blodgett
Frederick Germann Jr.
INVENTOR
John Illingworth,
BY Russell M. Everett,
ATTORNEY.
THE NORRIS PETERS CO., WASHINGTON, D. C.

UNITED STATES PATENT OFFICE.

JOHN ILLINGWORTH, OF NEWARK, NEW JERSEY.

VEHICLE-WHEEL.

969,536.   Specification of Letters Patent.   Patented Sept. 6, 1910.

Application filed January 19, 1910. Serial No. 538,899.

*To all whom it may concern:*

Be it known that I, JOHN ILLINGWORTH, a citizen of the United States, residing at Newark, in the county of Essex and State of New Jersey, have invented certain Improvements in Vehicle-Wheels, of which the following is a specification.

The objects of this invention are to secure a wheel for vehicles, and particularly automobiles, which shall be resilient and yet not pneumatic; to locate such resiliency at the rim of the wheel; to secure freedom of movement of the tread tire with respect to the rest of the wheel, without undue friction and wear; to secure durability and simplicity of construction, and to obtain other advantages and results as may be brought out in the following description.

Referring to the accompanying drawings, in which like numerals of reference indicate corresponding parts in each of the several figures, Figure 1 shows in side elevation a wheel of my improved construction, partly in section on line 1—1 of Fig. 2, looking in the direction of the arrow, and Fig. 2 is a cross-section of the rim of the wheel, taken on line 2—2 of Fig. 1.

In said drawings, 10 indicates the hub of an automobile wheel, 11 the spokes radiating from said hub, and 12 a felly supported upon said spokes. To said felly 12 is attached a detachable rim, comprising opposite side section 13 and 14, each substantially annular in form and projecting from the felly. The rim sections 13 and 14 have flanges 131, 132 and 141, 142, respectively, at their inner edges, which flanges are at an angle to each other and adapted to overlap one upon the circumferential periphery of the felly and the other upon a side of the felly, as clearly shown in Fig. 2. The flange 132 of the inner rim section 13 is preferably wider than the corresponding flange 142 of the outer rim section 14, so as to extend more than half way across the felly, and furthermore is bolted or riveted to said felly, as at 15. Bolts 16 pass through the felly 12 and rim section flanges 131, 141, perpendicular to the plane of the wheel, and obviously by tightening up these bolts the rim sections are drawn together and firmly held upon the felly in fixed relation thereto. Preferably the nuts 161 of the bolts 16 are at the outer side of the wheel, so that the outer rim section 14 can be readily and conveniently removed, when desired.

I have shown and described the above form of attachment of the rim sections to the felly for purposes of illustration only, and do not wish to be understood as limiting myself thereto. Various other means of attachment may occur to those skilled in the art, and which would suffice equally well to hold the rim sections in fixed relation to the felly.

The opposite annular side sections 13 and 14 of the detachable rim are concavo-convex in cross section, with their concave faces next each other, and their curvature extends far enough so that the outer edges of the rim sections approach each other or converge, as clearly shown in Fig. 2.

Between the sections 13 and 14 of the detachable rim, is a solid rubber tire 17, which is of circular cross section except at its inner side next the felly, where it is flattened, as at 18. The diameter of the cross section of this tire is such that the tire lies easily between the rim sections with its center sufficiently inside of a line connecting their outer edges so that the tire cannot escape between the converging edges of the rim sections. At the same time, the tire can move radially inward toward the felly a limited distance, between the rim sections 13 and 14.

At the inner flattened side 18 of the tire, I prefer to arrange an annular band 19 of leather or the like, which lies against the tire to receive the outward pressure of springs 20 next to be described. These springs are helical springs arranged radially of the wheel in sockets 21 bored through the rim flange 132 and into the felly 12. The springs 20 are seated in these sockets 21 and at their outer ends press against the band 19 to normally force the tire 17 outward and seat it against the rim flanges 13 and 14.

In use, the springs 20 directly over that point of the tire which is resting upon the road bed, yield or compress somewhat, and thus the wheel is cushioned by said springs, enabling a solid tire to be employed instead of a pneumatic. Punctures and other disadvantages incident to the use of pneumatic tires are thus avoided.

Having thus described the invention, what I claim is:

A wheel comprising a hub, spokes radiating from said hub, a felly mounted on said spokes, a detachable rim comprising opposite annular side sections concavo-convex in cross-section with their concave faces next each other and having their outer edges converging, means for clamping said sections at their inner edges to the felly in fixed relation thereto, an elastic tire between said rim sections of greater cross-sectional diameter thereat than the distance between said converging edges of the rim sections and having convex sides engaging said side sections of the rim, the curvature of said sides of the tire being on a shorter radius than the curvature of the inner sides of the rim sections and said tire adapted to move radially of the wheel between said rim sections, and springs between said tire and felly normally forcing the tire outward.

JOHN ILLINGWORTH.

In the presence of—
RUSSELL M. EVERETT,
FRANCES E. BLODGETT.